(No Model.)
T. R. DALLMEYER & F. BEAUCHAMP.
INSTANTANEOUS PHOTOGRAPHIC SHUTTER.
No. 449,733. Patented Apr. 7, 1891.
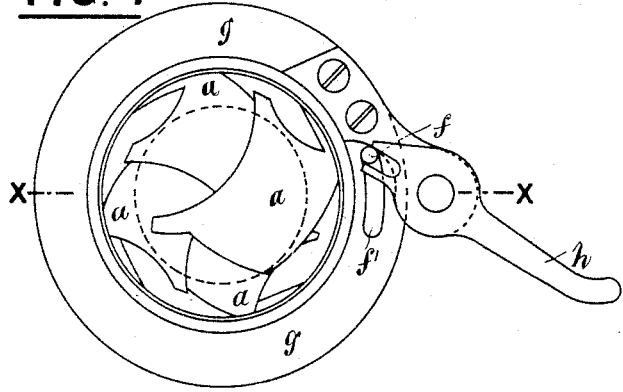
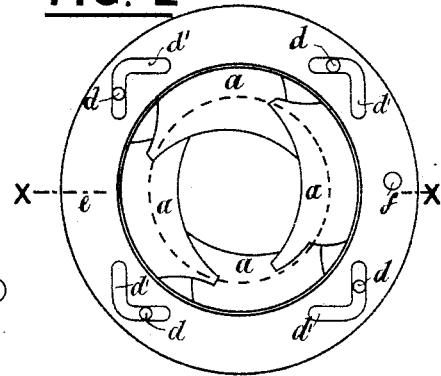
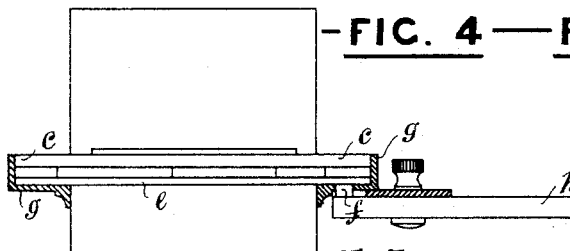
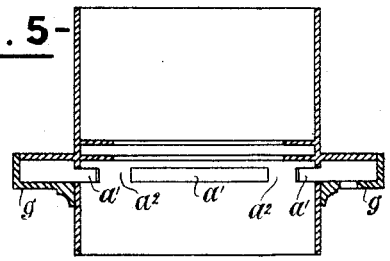
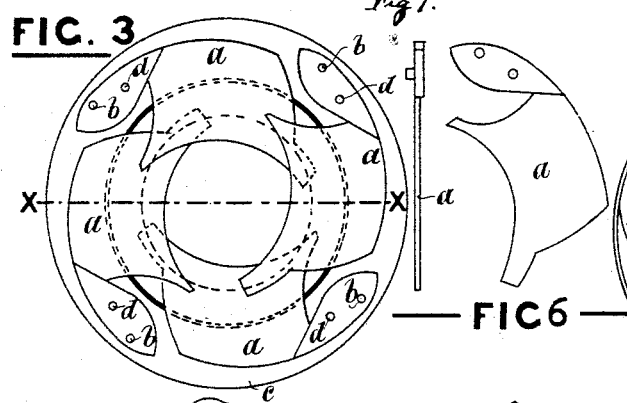
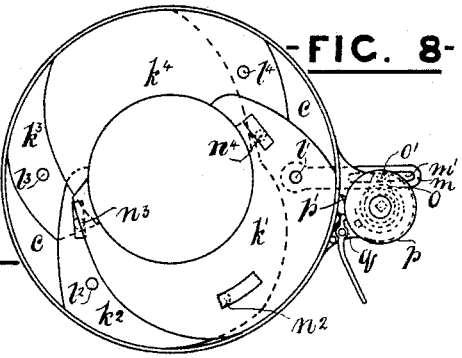
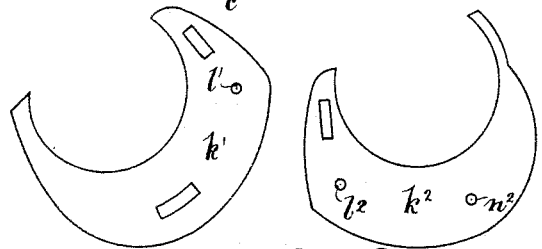
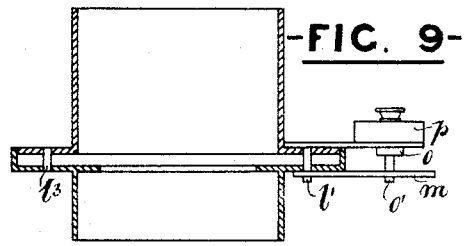

UNITED STATES PATENT OFFICE.

THOMAS RUDOLPH DALLMEYER AND FRANCIS BEAUCHAMP, OF LONDON, ENGLAND.

INSTANTANEOUS PHOTOGRAPHIC SHUTTERS.

SPECIFICATION forming part of Letters Patent No. 449,733, dated April 7, 1891.

Application filed December 7, 1889. Serial No. 332,912. (No model.) Patented in England April 22, 1887, No. 5,903, and in France April 27, 1888, No. 188,872.

*To all whom it may concern:*

Be it known that we, THOMAS RUDOLPH DALLMEYER, optician, and FRANCIS BEAUCHAMP, engineer, subjects of the Queen of Great Britain, and residing, respectively, at 25 Newman Street, Oxford Street, London, in the county of Middlesex, and Whalebone Lane, Chadwell Heath, London, in the county of Essex, both in the Kingdom of Great Britain, have invented new and useful Improvements in what are known as Instantaneous Photographic Shutters, (for which we have obtained patents in England, dated April 22, 1887, No. 5,903, and in France, dated April 27, 1888, No. 188,872,) of which the following is a specification.

Photographic shutters as at present made usually move across the lens either in front or behind the combination or combinations; but if between the combinations, it has hitherto been necessary to entirely sever the lens-mount to enable the shutters to open to the required distance to obtain full exposure of the lens. According to this invention, when the shutters are placed between the combinations the lens-tube is made in one piece, a slot being made in it for each segment of the shutter to pass into, an arrangement which gives great strength and insures the glasses of the lens remaining parallel to one another and at their proper distances apart. In order to effect the opening and closing of the shutters, we employ a crank operated by a suitable spring.

In order that our said invention may be most fully understood and readily carried into effect, we will proceed to describe the drawings hereto annexed.

Figure 1 is a front view of the apparatus with the shutter closed. Fig. 2 is a front view with the front plate and actuating-lever removed, the shutter being partly open. Fig. 3 is a front view with the front plate, actuating-lever, and cam-plate removed, the lens-tube being in section at a point corresponding with the aforesaid slots therein, the shutter-segments being shown as passing through the said slots. In these three figures the dotted circle shows the full opening of the shutter. Fig. 4 is a plan, partly in section. Fig. 5 is a longitudinal section of the lens-tube, taken on line X X of Figs. 1, 2, and 3. Figs. 6 and 7 are respectively an edge view and a plan of one of the shutter-segments.

$a\ a$ are the segments of the shutter, each being of a sickle or chopper-like form, as shown in Fig. 7. They are pivoted at $b\ b$ to an annular plate $c$, and they carry pins $d\ d$, which enter the angular slots or grooves $d'$ in the cam-plate $e$. The plate $e$ carries a pin $f$, which passes through a slot $f'$ in the cover-plate $g$. The pin $f$ centers a slot in the lever $h$, so that by moving the lever $h$ the cam-plate $e$ is turned, and the pins $d$, and consequently the shutter-segments $a$, are thereby forced first away from the center and then back again, by reason of the form of the slots $d'$ in the cam-plate $e$. The shutter is therefore first completely opened, and then, by the continuation of the same movement of cam-plate, is again closed. Each of the shutter-segments $a$ passes through its corresponding slot $a'$ in the lens-tube, the parts $a^2$ of such tube remaining solid, so as to secure continuity thereof and corresponding strength and rigidity. By this means full exposure of the lens can be secured—that is to say, the shutter can be opened to its full extent, so as to give full exposure of the lens without the necessity of severing the tube, in order to allow the segments of the shutter to open to their full extent.

Figs. 8, 9, and 10 show the arrangement for opening and closing the shutters by means of a crank operated by a spring. In this case the cam-plate $e$ is omitted, pins on two of the segments entering slots in the other two segments. Fig. 8 is a front view of the shutter when fully open, the front plate being removed. Fig. 9 is a transverse section of the same, and Fig. 10 are plans of the four shutters. $k'\ k^2\ k^3\ k^4$ are four shutters pivoted at $l'\ l^2\ l^3\ l^4$ to the annular plate $c$. They are actuated by a lever $m$, fixed to the segment $k'$. The segment $k^2$ carries a pin $n^2$, which enters a slot in the segment $k'$, and similarly the segments $k^3\ k^4$ carry pins $n^3\ n^4$, which enter slots in the segments $k'\ k^2$. The lever $m$ is slotted at $m'$, and this slot receives the crank-pin $o'$ upon the crank $o$. As the crank makes a half-revolution, the lever $m$ has a to-and-fro motion given to it. As shown, it is in its central position, the shutter being fully open. The crank $o$ is actuated by a spiral spring in the barrel $p$, which carries a projection $p'$, which is retained by a catch $q$. When the catch $q$ is freed, the spring causes the crank $o$ to make a half-revolution, and thereby to move the lever $m$ to and fro, and to first open the shutter and then close it again.

We claim—

In a photographic camera provided with instantaneous shutters, the combination of the annular plate $c$ and the shutters $k'\ k^2\ k^3\ k^4$, which are pivoted thereto at $l'\ l^2\ l^3\ l^4$, with the actuating-lever $m$, fixed to shutter $k'$, the crank $o$, provided with a crank-pin $o'$, which enters a slot $m'$ in said lever $m$, the shutters being similarly connected together by pins $n^2\ n^3\ n^4$, and the slots which these enter, the spiral spring for actuating said crank, the barrel $p$, inclosing and protecting the said spiral spring, the projection $p'$, and catch $q$ for retaining said spring, the freeing of said catch allowing the instantaneous automatic closing of said shutters, substantially as set forth.

THOMAS RUDOLPH DALLMEYER.
FRANCIS BEAUCHAMP.

Witnesses:
ALICK COOPER, R. C. A.,
    *Artist*, 103 *Sower St.*
S. S. DALLMEYER,
    25 *Newman St., W.*